United States Patent [19]

Cortes et al.

[11] Patent Number: 5,684,929
[45] Date of Patent: Nov. 4, 1997

[54] METHOD AND APPARATUS FOR DETERMINING THE LIMIT ON LEARNING MACHINE ACCURACY IMPOSED BY DATA QUALITY

[75] Inventors: Corinna Cortes, Yorktown Heights, N.Y.; Lawrence David Jackel, Holmdel, N.J.

[73] Assignee: Lucent Technologies Inc., Murray Hill, N.J.

[21] Appl. No.: 330,282

[22] Filed: Oct. 27, 1994

[51] Int. Cl.$^6$ .................................................. G06F 15/18
[52] U.S. Cl. .................................................. 395/21; 395/23
[58] Field of Search .................................. 395/20, 21, 22, 395/23

[56] References Cited

U.S. PATENT DOCUMENTS

| 5,033,006 | 7/1991 | Ishizuka et al. | 395/23 |
| 5,052,043 | 9/1991 | Gaborski | 395/23 |
| 5,095,443 | 3/1992 | Watanabe | 395/23 |

OTHER PUBLICATIONS

S. Bös, W. Kinzel, and M. Opper, Generalization Ability of Perceptrons with Continous Outputs, Physical Review E, vol. 47, No. 2, pp. 1384–1391, Feb. 1993.

W. P. Chiang, C. Cortes, L. D. Jackel, Y. LeCun, W. Lee, Accuracy Limits of Machine Learning: Predicting Communication Path Degradation or Failure, presented at Symposium on Intelligent Systems in Communications and Power, Puerto Rico, Feb. 21–23, 1994.

C. Cortes, Prediction of Generalization Ability in Learing Machines, PhD Thesis, University of Rochester, NY, 1993.

C. Cortes, L. D. Jackel, S. A. Solla, V. Vapnik, and J. S. Denker, Learing Curves: Asymptotic Values and Rate of Convergence, Advances in Neural Information Processing Systems, vol. 6, Morgan Kaufman, 1994.

T. L. Fine, *Statistical Generalization and Learning*, Technical Report EE577, Cornell University, Fall 1993.

K. Hornik, M. Stinchcombe, H. White, *Multilayer Feedforward Networks are Universal Approximators*, Neural Networks, vol. 2, pp. 359–366, 1989.

T. Kohonen, G. Barna, and R. Chrisley, *Statistical Pattern Recognition with Neural Networks: Benchmarking Studies*, Proc. IEEE Int. Conf on Neural Networks, ICCNN–88, vol. 1, p. I–61–I–68, 1988.

N. Murata, S. Yoshizawa, and S. Amari, *Learning Curves, Model Selection, and Complexity of Neural Networks*, Advances in Neural Information Processing Systems, vol. 5, pp. 607–614, Morgan Kaufman, 1992.

H. S. Seung, H. Sompolinsky, and N. Tishby, *Statistical Mechanics of Learning From Examples*, Physical Review A, vol. 45, No. 8 pp. 6056–6091, Apr. 15, 1992.

B. Moore, et al., "Characterizing the Error Function of a Neural Network," IEEE Symp. on the Frontiers of Massively Parallel Computation, pp. 49–57.

H. C. Leung and V. W. Zue, "Phonetic Classification Using Multi–Layer Perceptrons," 1990 Int'l. Conf. on Speech and Signal Processing, vol. 1, pp. 525–528.

K. A. Marko, et al., "Automotive Diagnostics Using Trainable Classifiers: Statistical Testing and Paradigm Selection," Int'l. Joint Conf. on Neural Networks 1990, vol. 1, pp. 33–38.

(List continued on next page.)

*Primary Examiner*—Robert W. Downs

[57] ABSTRACT

A method and apparatus for determining the limit on learning machine accuracy imposed by the quality of data. A plurality of learning machines of increasing capacity are trained using training data and tested using test data, and the training error rates and test error rates are calculated. The asymptotic error rates of the learning machines are calculated and compared. When the change in asymptotic error rate falls below a certain rate, the asymptotic error rate estimates the limit on learning machine accuracy imposed by the data.

20 Claims, 5 Drawing Sheets

OTHER PUBLICATIONS

W. Gang and O.Y.J. Zheng, "On the Bound of the Approximation Capacity of Multi–Layer Neural Network," 1991 Int'l. Joint Conf. on Neural Networks, vol. 3, pp. 2299–2304.

T. S. Lin and J. Meador, "Classification–Accuracy Monitored Backpropagation," 1992 Int'l. Symp. on Circuits and Systems, vol. 3, pp. 1553–1556.

Ward Cheney and David Kincaid, Numerical Mathematics and Computing, Brooks Cole Publishing, p. 99, 1985.

John Hertz, Anders Krogh, Richard G. Palmer, Introduction to the Theory of Neural Computation, Addison–Wesley, pp., 225–226, 1991.

James L. McClelland and David E. Rumelhart, Explorations in Parallel Distributed Processing: A Handbook of Models, Programs, and Exercises, MIT Press, pp. 1–10.

Ester Levin, Naftali Tishby, and Sara A. Solla, A Statistical Approach to Learning and Generalization in layered Neural Networks, Proceedings of the IEEE, vol. 78, No. 10, pp. 1568–1574.

Naftali Tishby, Ester Levin, and Sara A. Solla, Consistent Inference of Probabilities in Layered Networks: Predictions and Generalizations, IEEE International Conference on Neural Networks, pp. II–402 II–409, 1989.

Shun–ichi Amari, Learning Curves, Generalization Errors and Information Criteria, Artificial Neural Networks, 2, I. Aleksander and J. Taylor eds., Elsevier, pp. 305–311, 1992.

M. Stone, Cross–validatory Choice and Assessment of Statistical Predictions, J. Royal Stat. Soc., vol. 36, No. 1, pp. 111–147, 1974.

Shun–chi Amari and Noboru Murata, Statistical Theory of Learning Curves under Entropic Loss Criterion, Neural Computation, vol. 5, pp. 140–153, 1993.

METHOD AND APPARATUS FOR DETERMINING THE LIMIT ON LEARNING MACHINE ACCURACY IMPOSED BY DATA QUALITY

FIELD OF THE INVENTION

This invention relates generally to learning machines. More particularly, this invention relates to determining the limits on learning machine accuracy imposed by data quality.

BACKGROUND OF THE INVENTION

In general, a "learning machine" is a device that takes an unknown input vector and produces an output vector. More particularly, it performs a mapping function from an input space to an output space. Thus, given certain input data, the learning machine will classify the data and assign a label to the data. For example, consider handwriting recognition. The input data to the learning machine may be digital data representing a scanned image of a handwritten alphabetic character. The learning machine will receive the input data, analyze it, and classify it as an alphabetic character and assign to the data a label corresponding to the character.

The particular mapping implemented by a learning machine depends on the setting of internal parameters of the learning machine. These parameters are adjusted by a learning algorithm during a training phase wherein a training data set is provided to train the learning machine. The training data set contains input data along with labels indicating the correct classification of the input data. The learning algorithm adjusts the internal parameters so that the labels produced by the learning machine in response to the training set match, as well as possible, their provided labels. The number of patterns that the machine can match is called the "capacity" of the machine. Generally, the capacity of a machine increases with the number of free parameters. After training is complete, the generalization ability of the machine is estimated by its performance on a test data set, which the machine has not previously analyzed.

Examples of known learning machines are neural networks and learning vector quantization machines. Briefly, neural networks are parallel networks of non-linear input-output units, interconnected by adaptive connections or weights. The most common architecture consists of layers of units, where the outputs from one layer of units serve as inputs to the next layer of units. The first layer of units receives the input data and is called the input layer. The output from the last layer of units represents the network's classification of the given input and is called the output layer. Any layer of units between the input and output layer is called a hidden layer. The capacity of a neural network is approximated by the number of adaptive weights in the network.

Briefly, a learning vector quantization machine categorizes a training set of input vectors into a number of classes and labels each input vector according to the class label. The classes are each defined by a codebook vector, and the class membership of an input vector is determined by finding the nearest codebook vector using the sum of squared distances (the ordinary Euclidean metric). The number of codebook vectors is determined before training, and their location adjusted during training. The capacity of a learning vector quantization machine is approximately the number of codebook vectors.

Learning machines of the type described herein are well known to those skilled in the art. Thus, the details of the structure, training and testing of such machines will not be discussed further herein, with the understanding that such machines and techniques are well known and could be readily implemented by one skilled in the art. For general background on learning machines, see generally, J. Hertz, A. Krogh, and R. G. Palmer, *Introduction to the Theory of Neural Computation*, Addison-Wesley, 1991.

The data on which the learning machine operates must be collected by some process. Such data collection for a classification task is prone to random errors, e.g., inaccuracies in the measurement of the input or mislabeling of the output. Missing or insufficient data are other sources that may complicate a learning task and hinder accurate performance of the trained machine. These insufficiencies of the data limit the performance of any learning machine trained on and applied to the data collection, regardless of how complex the machine or how much data is used to train it.

It is therefore desirable to have a method of determining the performance limitation of a learning machine, which is imposed by the inherent quality of the data.

SUMMARY OF THE INVENTION

This invention discloses a method and apparatus for estimating the limiting performance of learning machines imposed by the quality of the data used for a task. A learning machine is trained using a training data set, and the training error is calculated. The trained learning machine is then tested using a test data set, and the test error is calculated. The asymptotic error rate for the learning machine is calculated as the mean of the training error and test error. These steps are repeated for learning machines of increasing capacity until the asymptotic error rate represents an acceptable estimation of the limiting performance of any learning machine on the given data. The estimated limiting performance expresses a characteristic of the data and is independent of the choice of learning machine used.

The advantages of the present invention will be apparent to those of ordinary skill in the art by reference to the following detailed description and the accompanying drawings.

DETAILED DESCRIPTION

Figure 1:
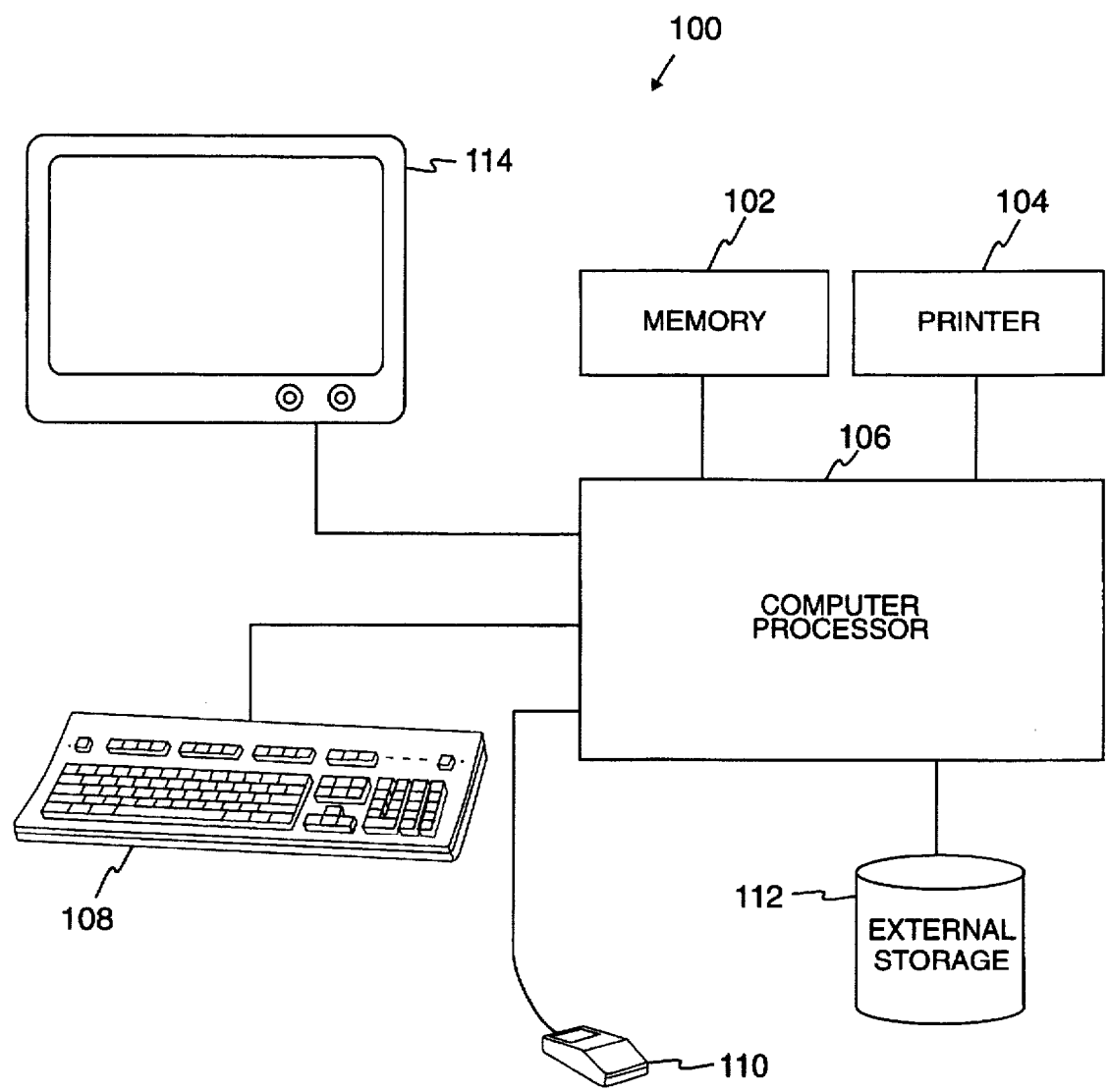
FIG. 1 shows a schematic of the components of a computer system which can be used in accordance with the present invention.

The system described herein may be implemented using one or more programmed digital computers of the type well known in the art and shown in FIG. 1. FIG. 1 shows a computer system 100 which comprises output devices such as a computer display monitor 114 and a printer 104, a textual input device such as a computer keyboard 108, a graphical input device such as a mouse 110, a computer processor 106, a memory unit 102, and an external storage device such as a disk drive 112. The computer processor 106 is connected to the display monitor 114, the printer 104, the memory unit 102, the external storage device 112, the keyboard 108, and the mouse 110. The external storage device 112 and the memory unit 102 may be used for the storage of data and computer program code. The functions of the present invention may be performed by the computer processor 106 executing computer program code which is stored in the memory unit 102 or the external storage device 112. The computer system 100 may suitably be any one of the types which are well known in the art such as a mainframe computer, a minicomputer, a workstation, or a personal computer.

As discussed above, a learning machine may be used to classify input data and to assign labels to the input data. An error is committed by the learning machine when it incorrectly classifies input data and assigns an incorrect label. This may occur during both training and testing. The error rate of the learning machine during the training phase is called the training error. The error rate of the learning machine during the test phase is called the test error.

The training of a learning machine is briefly described with reference to FIG. 2, which shows a learning machine 302 comprising a classifier 301 and a training algorithm 312. The classifier 301 includes a set of internal adjustable parameters 304. The number of these internal adjustable parameters 304 generally determines the capacity of the learning machine 302.

The training data set is shown as 306. As discussed above, the training data set 306 consists of vector input data 308 and associated labels 310. During the training phase, the vector input data 308 is provided to the classifier 301 of the learning machine 302 and associated labels 310 are provided to the training algorithm 312 of the learning machine 302. The training algorithm 312 trains the classifier 301 by adjusting its internal parameters 304. The classifier 301 classifies the vector input data 308 and assigns labels 314. The assigned labels 314 are provided to the training algorithm 312 in order to compare the provided labels 310 to the assigned labels 314. The training algorithm 312 computes the training error rate 316 based on the number of correctly and incorrectly assigned labels.

The testing of the trained learning machine 302 is briefly described with reference to FIG. 3, which shows the classifier 301 of the learning machine 302 and its internal parameters 304 which were set during the training phase discussed above in conjunction with FIG. 2. During testing, a test data set 320 is used to test the classification ability of the learning machine 302. This test data set 320 is independent of the training data set 306 used during training. The vector input data 322 is provided to the classifier 301 of the trained learning machine 302. Based on the internal parameters 304, the classifier 301 classifies the vector input data 322 and assigns labels 326 to the data. These assigned labels 326 are provided to a compare algorithm 328. The associated labels 324 from the test data set 320 are also provided to the compare algorithm 328. The compare algorithm 328 compares the provided labels 324 to the assigned labels 326 and computes the test error rate 330 based on the number of correctly and incorrectly assigned labels.

Figure 2:
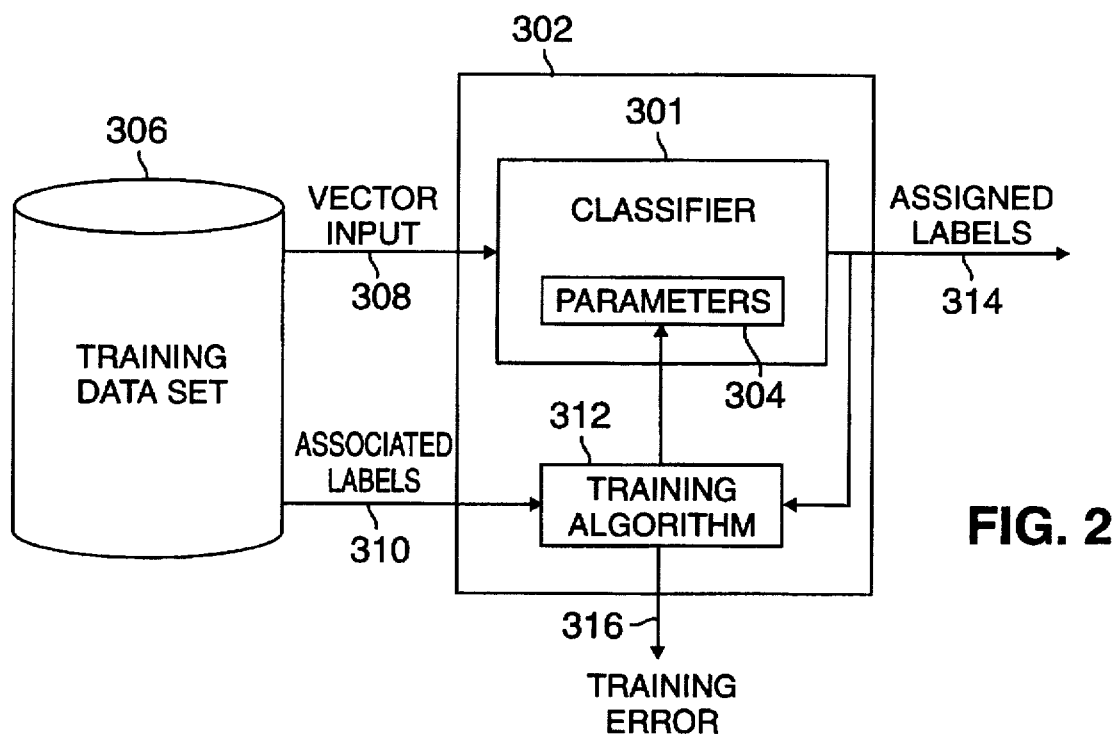
FIG. 2 shows a block diagram of a system for training a learning machine.
Figure 3:
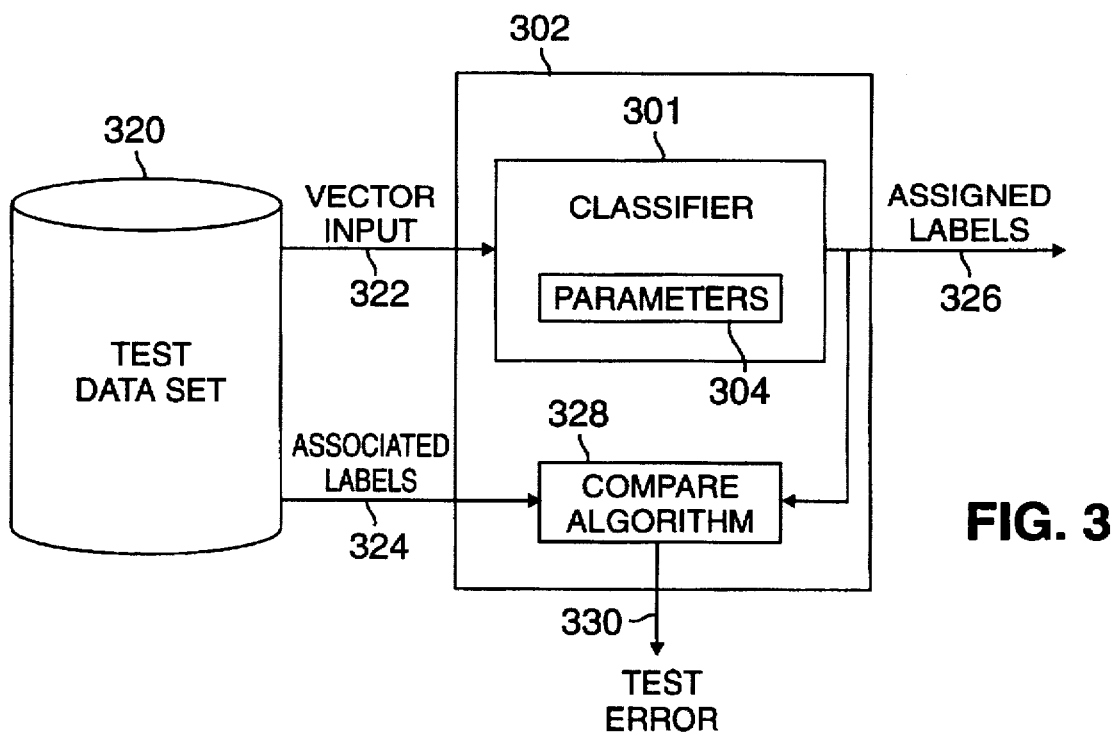
FIG. 3 shows a block diagram of a system for testing a learning machine.

FIGS. 2 and 3 show various components of the learning machine 302, such as the classifier 301, internal parameters 304, training algorithm 312 and compare algorithm 328, as separate components. However, it should be understood that in the preferred embodiment, the learning machine 302 is implemented with a digital computer system of the type shown in FIG. 1. In such an implementation, the various components of the learning machine 302 are implemented through the use of stored computer program code being executed by the computer processor in a manner well known in the art. Thus, FIGS. 2 and 3 show the learning machine 302 containing different components during the learning phase and testing phase only to more clearly describe the functioning of the learning machine during those phases.

The test error and training error depend on the size 1 of the training data set, the capacity h of the learning machine and how well suited the machine is to implement the task at hand. This suitability depends on both the architecture of the learning machine and the training algorithm. The architecture of the learning machine determines a family of mappings that the learning machine can implement. The learning algorithm determines which of these mappings is realized by the trained machine. A well suited architecture will, in its family of mappings, contain good matches to the task at hand. A well suited training algorithm will locate the best, or only slightly sub-optimal, mapping.

Figure 4:
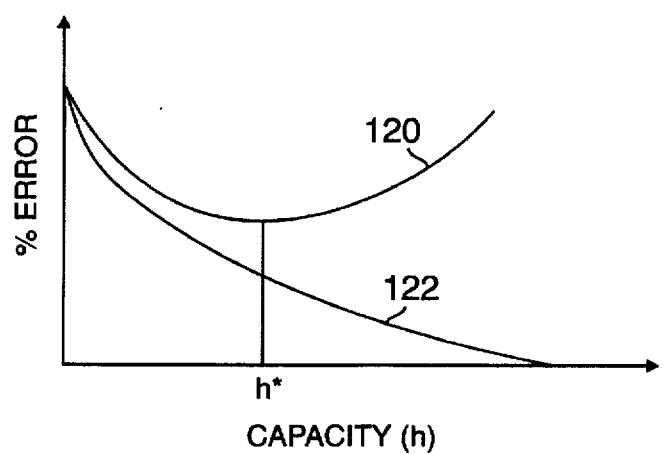
FIG. 4 shows training error and test error as a function of learning machine capacity for a fixed training set size.

FIG. 4 shows typical training error 122 and test error 120 as a function of the capacity h of a learning machine. FIG. 4 shows the typical behavior of the test error 120 and training error 122 for a task as the capacity h is varied but the amount of training data 1 is fixed. This scenario can be obtained by increasing the number of hidden units where the learning machine is a neural network or by increasing the number of codebook vectors in a learning vector quantization machine. See, T. Kohonen, G. Barna, and R. Chrisley, *Statistical Pattern Recognition with Neural Networks: Benchmarking Studies,* Proc. IEEE Int. Conf on Neural Networks, ICNN-88, vol. 1, page I-61–I-68, 1988. For h<1 there are many fewer free parameters than training examples and the machine is over constrained. It does not have enough complexity to model the regularities of the training data, so both the training error 122 and test error 120 are large. This situation is called underfitting. As h increases the learning machine can begin to fit the general trends in the data which carries over to the test set, so both the training error 122 and test error 120 decline. Since the performance of the machine is optimized on only part of the full pattern space, the test error 120 will always be larger than the training error 122. As the capacity h of the learning machine increases the training error 122 continues to decline, and eventually it reaches zero when there are enough free parameters to completely model the training data set. The behavior of the test error 120 is different. Initially it decreases, but at some capacity, h*, it starts to rise. The rise occurs because the ample resources of the training machine are applied to learning vagaries of the training set, which are not reproduced in the test set. This situation is called overfitting. The optimal, or lowest, test error 120 is achieved at a capacity h* that is typically smaller than the capacity for which zero error is achieved on the training set. The learning machine with capacity h* will typically commit errors on misclassified or outlying patterns of the training set.

Figure 5:
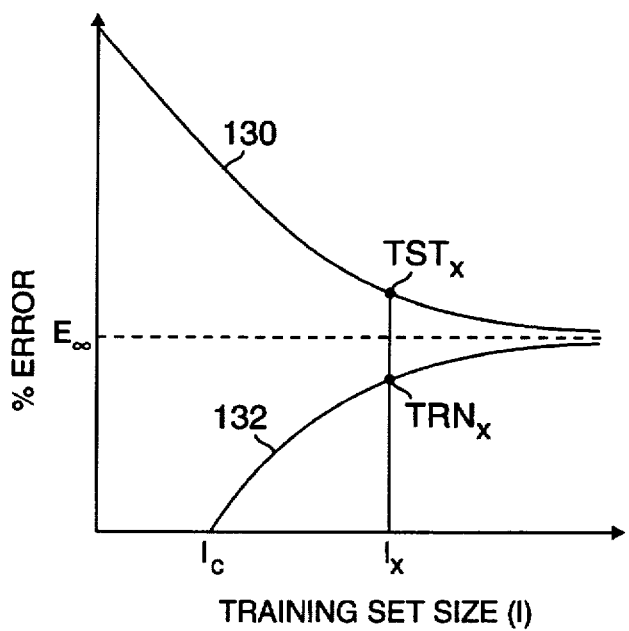
FIG. 5 shows training error and test error as a function of training set size for a fixed learning machine capacity.

FIG. 5 shows the test error 130 and training error 132 as a function of the training set size 1 for fixed capacity h of a learning machine. This scenario can be obtained by training the learning machine on increasingly larger training data sets. Where 1 is small there are enough free parameters to completely model the training set, so the training error 132 is zero. Excess capacity is used by the learning machine to model details in the training set, leading to a large test error 130. As the training set size 1 is increased the learning machine is trained on more patterns so the test error 130 declines. For some critical size of the training set, $1_c$, the learning machine can no longer model all the training patterns and the training error 132 starts to rise. As 1 is increased, the irregularities of the individual training patterns smooth out, and the parameters of the learning machine are utilized to model the true underlying function. The test error 130 declines, and asymptotically the training error 132 and test error 130 reach the same error value $E_\infty$. This error value is the limiting performance of the given learning machine to the task. In practice we never have the infinite amount of training data needed to achieve $E_\infty$. However, $E_\infty$ can be estimated by averaging the training error 132 and test error 130 at a point where $l > l_c$. See, H. S. Seung, H. Sompolinsky, and N. Tishby, *Statistical Mechanics of Learning From Examples*, Physical Review A, Vol. 45, No. 8 pp. 6056–6091, Apr. 15, 1992; S. Bös, W. Kinzel, and M. Opper, *Generalization Ability of Perceptrons with Continuous Outputs*, Physical Review E, Vol. 47, No. 2, pp. 1384–1391, February 1993; C. Cortes, *Prediction of Generalization Ability in Learning Machines*, PhD Thesis, University of Rochester, N.Y., 1993; N. Murata, S. Yoshizawa, and S. Amari, *Learning Curves, Model Selection, and Complexity of Neural Networks*, Advances in Neural Information Processing Systems, Vol. 5, pp. 607–614, Morgan Kaufman, 1992; T. L. Fine, *Statistical Generalization and Learning*, Technical Report EE577, Cornell University, Fall 1993; and C. Cortes, L. D. Jackel, S. A. Solla, V. Vapnik, and J. S. Denker, *Learning Curves: Asymptotic Values and Rate of Convergence*, Advances in Neural Information Processing Systems, Vol. 6, Morgan Kaufman, 1994. In this manner the optimal performance of a given machine can be predicted.

Thus, the asymptotic error value $E_\infty$ for a given learning machine can be calculated by training the learning machine with a training data set with a size greater than $1_c$. For example, referring to FIG. 5, suppose the learning machine is trained using a training set of size $1_x$. The machine is then tested using the test data set, and the test error $TST_x$ and the training error $TRN_x$ are calculated. The error value $E_\infty$ is calculated as:

$$E_\infty = \frac{TST_X + TRN_X}{2}$$

The resulting value of $E_\infty$ represents the lowest test error rate which can be expected with the given learning machine and the given data.

Figure 6:
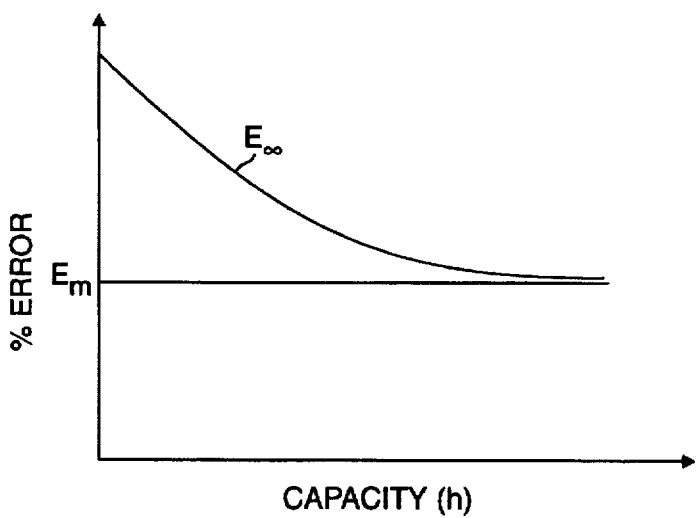
FIG. 6 shows the asymptotic error rate as a function of learning machine capacity.

The value of the asymptotic error $E_\infty$ of a given machine depends on the quality of the data and the set of functions the machine can implement. The set of available functions increases with the capacity of the machine, so low capacity machines will typically exhibit a high asymptotic error $E_\infty$ due to a large difference between the true noise-free function of the patterns and the function implemented by the learning machine. As h increases this difference decreases. Eventually the difference reaches zero, so the asymptotic error $E_\infty$ only measures the intrinsic noise level of the data. When the actual capacity of the machine matches the complexity of the true function, no further improvement in $E_\infty$ can be achieved. Such a capacity is called the desired capacity. FIG. 6 shows how the error rate $E_\infty$ decreases as the capacity h of the learning machine increases. The error rate $E_\infty$ will asymptotically reach a minimum value $E_m$, which represents the lowest test error rate which can be achieved on the given data, independent of the learning machine.

It is assumed herein that $E_\infty$ decays approximately linearly in the ratio of actual to desired capacity as shown in FIG. 6. However, in certain cases, $E_\infty$ may exhibit several plateaus or may be discontinuous with the increasing capacity of the learning machine. Such cases are not considered herein because they rarely occur in actual implementation.

Thus, the intrinsic noise level of the data or the limiting performance of any learning machine may be estimated as the asymptotic value of $E_\infty$ as obtained for learning machines with increasing capacity applied to the task.

Figure 7:
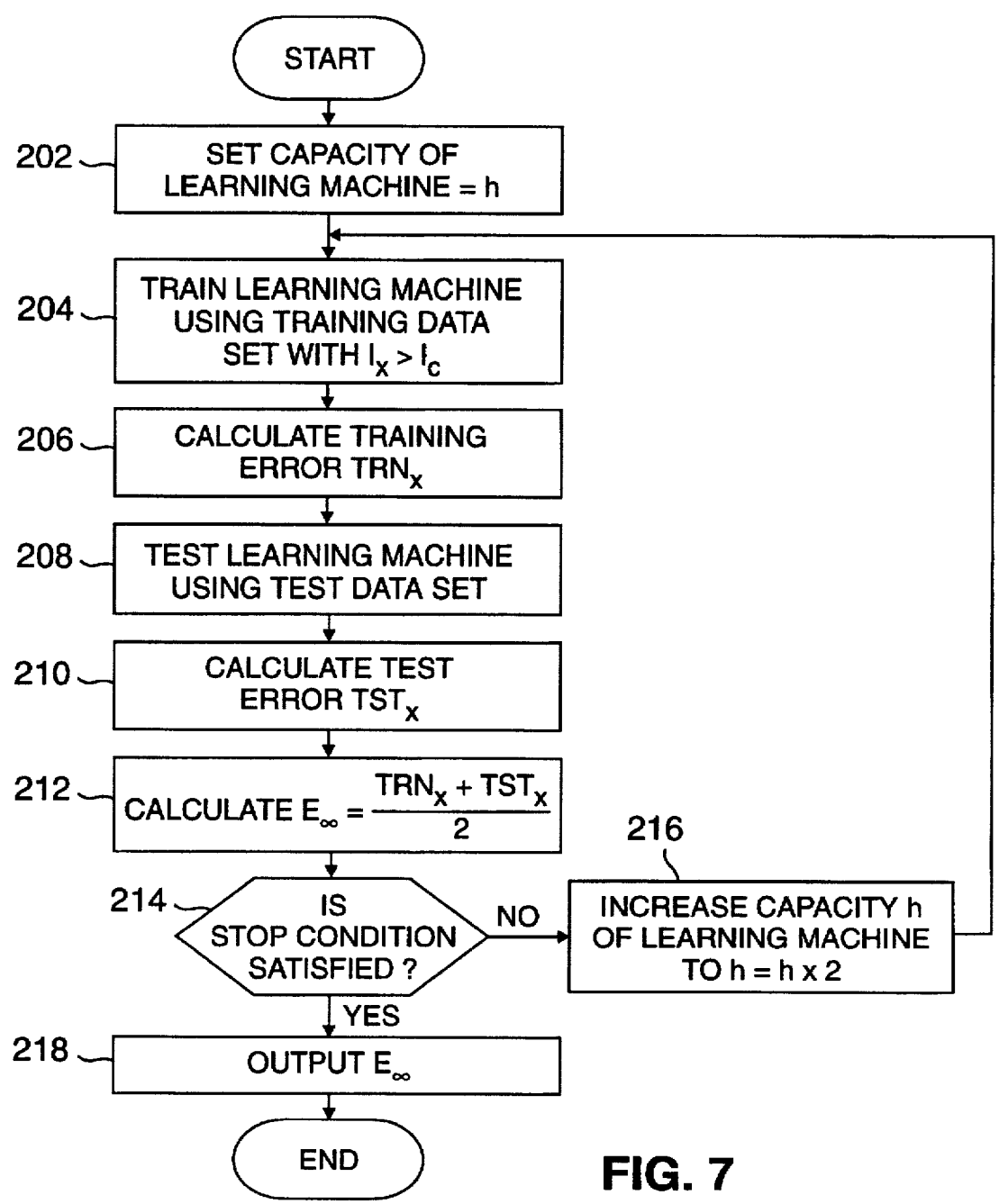
FIG. 7 shows a flow diagram of the steps for estimating the limiting performance of a learning machine imposed by data quality.

The method for estimating the value $E_\infty$ which represents the limiting performance on any given learning machine for a given set of data is described in conjunction with FIG. 7. In step 202, the learning machine is set to capacity h. In step 204 the learning machine is trained using a training data set of size $1_x$ where $1_x$ is greater than $1_c$. As described above, this will insure a training error 132 (FIG. 5) greater than zero. The training error $TRN_x$ is calculated in step 206. The learning machine is tested using the test data set in step 208. The test error $TST_x$ is calculated in step 210. In step 212 $E_\infty$ is calculated as $$E_\infty = \frac{TRN_x + TST_x}{2}$$

In step 214 it is determined whether the stop condition is satisfied. As seen in FIG. 6, $E_\infty$ can be calculated for learning machines with increasing capacity h to estimate the value $E_m$. However, $E_\infty$ will most likely never reach $E_m$, and therefore the disclosed method is for determining an estimation of $E_m$. The continuing calculations of $E_\infty$ with a machine of increasing capacity h may be stopped at any point where $E_\infty$ represents an acceptable approximation of $E_m$. In a preferred embodiment the relative differences of consecutively calculated values of $E_\infty$ are compared to a predetermined stop value in order to obtain a desired accuracy (e.g., 5–10%). For example, if a first calculated value of $E_\infty$ is represented as $E_\infty^i$ and the next calculated value of $E_\infty$ is represented as $E_\infty^{i+1}$, then the relative difference D of the values is $$D = \frac{E_\infty^{i+1} - E_\infty^i}{E_\infty^i}$$

Thus, if D is less than or equal to a predetermined stop value which represents the desired accuracy, then the stop condition has been reached. It has been found that a preferred accuracy is obtained when the relative difference D is in the range of 5–10%. However, other values may be used for the stop value in order to achieve the desired accuracy. If the stop condition is satisfied, the current value of $E_\infty$ represents the acceptable estimation of the value of $E_m$, and that value is outputted in step 218. If the stop condition is not satisfied, then the capacity h of the learning machine is increased. In a preferred embodiment, the capacity h is increased by a factor of two. However, the capacity h may be increased by other amounts. Control is passed to step 204 and the steps 204 through 216 are repeated until the stop condition is satisfied.

In the method described in conjunction with FIG. 7, the capacity h of the learning machine is increased in step 216 and steps 204 through 212 are repeated until the stop condition is satisfied. In an alternate embodiment, each time steps 204 through 212 are repeated, they could be performed on physically different learning machines, each with increasing capacity.

Figure 8:
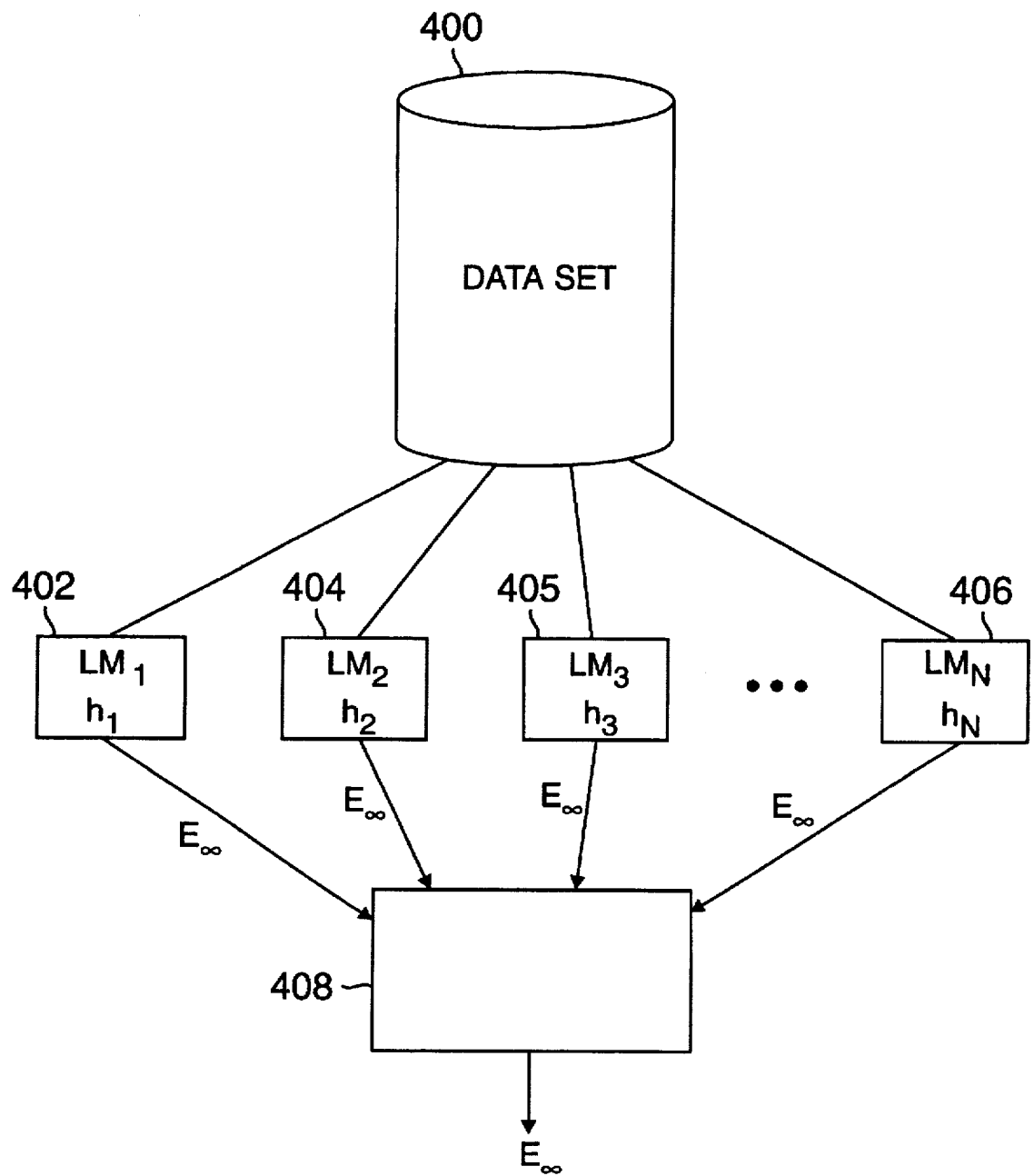
FIG. 8 shows a system for estimating the limiting performance of a learning machine imposed by data quality.

One system for estimating the value $E_m$ is described in conjunction with FIG. 8. FIG. 8 shows a data set 400, which includes both training data and test data. The training data from data set 400 is first provided to learning machine $LM_1$ 402 of capacity $h_1$. Learning machine $LM_1$ 402 is trained on the training data of data set 400 and the training error is calculated as described above in conjunction with FIG. 2. The test data from data set 400 is then provided to learning machine $LM_1$ 402. Learning machine $LM_1$ 402 is tested on the test data of data set 400 and the test error is calculated as described above in conjunction with FIG. 3. Learning machine $LM_1$ 402 computes the asymptotic error rate $E_\infty$ as described above and provides the asymptotic error rate $E_\infty$ to processor 408.

The training data from data set 400 is next provided to learning machine $LM_2$ 404 of capacity $h_2$, where $h_1 < h_2$. Learning machine $LM_2$ 404 is trained on the training data of data set 400 and the training error is calculated. The test data from data set 400 is then provided to learning machine $LM_2$ 404. Learning machine $LM_2$ 404 is tested on the test data of data set 400 and the test error is calculated. Learning machine $LM_2$ 404 computes the asymptotic error rate $E_\infty$ and provides the asymptotic error rate $E_\infty$ to processor 408.

Processor 408 will compare the asymptotic error rates $E_\infty$ provided from learning machines $LM_1$ 402 and $LM_2$ 404 to determine if a stop condition has been satisfied. This stop condition has been described above in conjunction with FIG. 7 and step 214. If the stop condition has been satisfied, then $E_\infty$ represents the estimate $E_m$ of the lowest error rate which can be achieved on the given data set 400 and $E_\infty$ is outputted. If the stop condition has not been reached, then learning machine $LM_3$ 405 of capacity $h_3$, where $h_1 < h_2 < h_3$, is trained and tested using data set 400 in a manner similar to that of learning machines $LM_1$ 402 and $LM_2$ 404, and the asymptotic error rate $E_\infty$ is provided to processor 408. Processor 408 will compare the asymptotic error rates $E_\infty$ provided from learning machines $LM_2$ 404 and $LM_3$ 405 to determine if a stop condition has been reached. If the stop condition has been reached, then $E_\infty$ represents the estimate $E_m$ of the lowest error rate which can be achieved on the given data set 400 and $E_\infty$ is outputted. If the stop condition has not been reached, then the above procedure is repeated on learning machines of increasing capacity, such that $h_1 < h_2 < h_3 < \ldots < h_N$, until the stop condition is reached.

FIG. 8 shows each of the learning machines $LM_1$ 402, $LM_2$ 404, $LM_3$ 405, through $LM_N$ 406, as separate units. Each of these learning machines $LM_1$ 402, $LM_2$ 404, $LM_3$ 405 through $LM_N$ 406 could be implemented using a separate computer system of the type described above in conjunction with FIG. 1. In an alternate embodiment, each of the learning machines $LM_1$ 402, $LM_2$ 404, $LM_3$ 405, through $LM_N$ 406, could be implemented in a single computer system of the type described above in conjunction with FIG. 1. Such an embodiment is possible since each of the learning machines may be trained and tested in sequence. In such an embodiment, the implementation of learning machines of increasing capacity could be implemented by increasing the number of hidden units where the learning machine is a neural network or by increasing the number of codebook vectors in a learning vector quantization machine. In such an embodiment, each of the learning machines $LM_1$ 402, $LM_2$ 404, $LM_3$ 405, through $LM_N$ 406 shown in FIG. 8 could be considered as virtual learning machines since they are implemented in a single computer system. In a similar manner, processor 408 could be implemented by the same computer system used to implement the virtual learning machines $LM_1$ 402, $LM_2$ 404, $LM_3$ 405, through $LM_N$ 406.

A method and apparatus for determining the limit of learning machine accuracy imposed by data quality is disclosed. It is to be understood that the embodiments shown and described herein are only illustrative of the principles of the present invention and that various modifications may be implemented by those skilled in the art without departing from the scope and spirit of the invention.

We claim:

1. A method for determining an accuracy limit of a learning machine for a data set having an intrinsic noise level, said data set comprising a training data set and a test data set, the method comprising the steps of:
   a) training the learning machine having a capacity to classify said data set using said training data set and calculating a training error;
   b) testing said learning machine using said test data set and calculating a test error;
   c) calculating an asymptotic error rate based on said test error and said training error;
   d) determining whether a stop condition has been satisfied; and
   e) if the stop condition is not satisfied, repeating steps a) through d) until said stop condition is satisfied, wherein each repetition of said steps is performed in conjunction with a learning machine having a capacity greater than that of the previous repetition of said steps.

2. The method of claim 1 wherein step c) further comprises calculating the mean of said test error and said training error.

3. The method of claim 1 wherein step d) further comprises comparing the relative difference of the calculated asymptotic error rates to a predetermined stop value.

4. The method of claim 3 wherein the comparing step further comprises comparing the relative difference of the calculated asymptotic error rates to a predetermined stop value which is in a range of 5 to 10 percent.

5. The method of claim 1 wherein said training data set has a size sufficient to have a training error that is greater than zero.

6. A method for determining an accuracy limit of a learning machine for a data set comprising training data and test data, the method comprising the steps of:
   a) training the learning machine having a capacity to classify the data in said data set using said training data and calculating a training error;
   b) testing said learning machine using said test data and calculating a test error;
   c) calculating an asymptotic error rate based on said training error and said test error;
   d) determining whether a stop condition is satisfied;
   e) if said stop condition is not satisfied then increasing the capacity of said learning machine and repeating steps a) through d) until said stop condition is satisfied; and
   f) if said stop condition is satisfied then outputting said asymptotic error rate as the limit on learning machine accuracy imposed by said given data set.

7. The method of claim 6 wherein said learning machine is a neural network having at least one hidden unit defining the capacity of said learning machine and wherein said step of increasing the capacity of said learning machine further comprises increasing the number of hidden units of said neural network.

8. The method of claim 6 wherein said learning machine is a learning vector quantization machine having at least one codebook vector defining the capacity of said learning machine and wherein the step of increasing the capacity of said learning machine further comprises increasing the number of codebook vectors of said learning vector quantization machine.

9. The method of claim 6 wherein the step of increasing the capacity of said learning machine further comprises increasing said capacity by a factor of 2.

10. The method of claim 6 wherein step d) further comprises comparing the relative difference of the calculated asymptotic error rates to a predetermined value.

11. The method of claim 10 wherein the comparing step further comprises comparing the relative difference of the calculated asymptotic error rates to a predetermined stop value which is in a range of 5 to 10 percent.

12. A system for determining the limit on learning machine accuracy imposed by data integrity comprising:

means for storing a data set having training data and test data;

a plurality of learning machines, each having a unique capacity, each of said learning machines comprising:
 a) means responsive to said data set for training said learning machine to classify data using said training data and for calculating a training error,
 b) means responsive to said data set for testing the classification ability of said learning machine using said test data and for calculating a test error, and
 c) means for calculating an asymptotic error rate based on said training error and said test error; and means for comparing asymptotic error rates of different learning machines to determine whether a stop condition has been reached and for outputting an asymptotic error rate as an estimated limit on learning machine accuracy imposed by data integrity when said stop condition is reached.

13. The system of claim 12 wherein said means for calculating an asymptotic error rate of said training error and said test error further comprises means for calculating the mean of said training error and said test error.

14. The system of claim 12 wherein said means for comparing asymptotic error rates to determine whether a stop condition has been reached further comprises means for comparing the relative difference of asymptotic error rates of different learning machines to a stop value.

15. The system of claim 14 wherein said stop value is in a range of 5 to 10 percent.

16. The system of claim 12 wherein said training data is of sufficient size such that said calculated training error is greater than zero.

17. An apparatus for determining the limit on learning machine accuracy imposed by a data set comprising:

a storage unit storing a data set having training data and test data;

a memory unit containing computer program code;

a processor unit for executing said computer program code to implement separately a plurality of virtual learning machines, each implemented virtual learning machine having a different capacity;

means for training each of said implemented virtual learning machines to classify said data set using said training data and for calculating a training error;

means for testing the classification ability of each of said implemented virtual learning machines using said test data and for calculating a test error;

means for calculating an asymptotic error rate of said training error and said test error for each of said implemented virtual learning machines; and means for comparing said asymptotic error rates to determine the limit on learning machine accuracy imposed by said data set.

18. The apparatus of claim 17 wherein said comparing means further comprises:

means for comparing to a stop value a relative difference of asymptotic error rates of a first implemented virtual learning machine and a second implemented virtual learning machine, the second implemented virtual learning machine having a capacity greater than the first implemented virtual learning machine; and means for outputting an asymptotic error rate as the limit on learning machine accuracy imposed by said data set when said relative difference is equal to or less than said stop value.

19. The apparatus of claim 18 wherein said stop value is in a range of 5 to 10 percent.

20. The apparatus of claim 17 wherein said calculating means further comprises means for calculating the mean of said training error and said test error.

* * * * *